United States Patent
Brownsberger

(12) 
(10) Patent No.: US 6,739,941 B1
(45) Date of Patent: May 25, 2004

(54) METHOD AND ARTICLES FOR PROVIDING EDUCATION AND SUPPORT RELATED TO WILDLIFE AND WILDLIFE CONSERVATION

(75) Inventor: Scott Brownsberger, Hermosa Beach, CA (US)

(73) Assignee: Planet Rascals, El Segundo, CA (US)

( * ) Notice: Subject to any disclaimer, the term of this patent is extended or adjusted under 35 U.S.C. 154(b) by 0 days.

(21) Appl. No.: 09/619,805

(22) Filed: Jul. 20, 2000

(51) Int. Cl.⁷ .............................................. A63H 3/02
(52) U.S. Cl. ........................... 446/369; 705/1; 705/26; 446/268
(58) Field of Search ................................ 446/369, 268, 446/72, 97, 98, 99; 705/1, 26, 27, 14, 16

(56) References Cited

U.S. PATENT DOCUMENTS 5,752,880 A * 5/1998 Gabai et al. ................. 463/1 X
5,966,526 A * 10/1999 Yokoi ........................... 703/11
5,971,855 A * 10/1999 Ng ............................ 463/42 X (List continued on next page.)

FOREIGN PATENT DOCUMENTS

EP          0 868 032 A2     9/1998
WO         WO 97/17653       5/1997
WO         WO 98/483363      10/1998

(List continued on next page.)

OTHER PUBLICATIONS

SPOTZ: It's Important! Advance the Cause of Wildlife Conservation. [online].Phoenix Zoo, 2000–2002 [retrieved on Jul. 17, 2002].Retrieved from the Internet: <URL: http://www.phoenixzoo.org/zoo/shop/spotz2.asp>.*

SPOTZ: It's Fun! Become a Special Parent of the Zoo. [online].Phoenix Zoo, 2000–2002 [retrieved on Jul. 17, 2002].Retrieved from the Internet: <URL: http://www.phoenixzoo.org/zoo/shop/spotz.asp>.*

Animals Depend on People Too. [online].Como Zoo and Conservatory, 2000–2001 [retrieved on Jul. 17, 2002].Retrieved from the Internet: <URL: http://www.stpaul.gov/depts/parks/comopark.czcs/adopt1.html>.*

Marine Mammals: Dolphins and Whales. [online]. 1998 [retrieved on Jul. 15, 2002].Retrieved from the Internet: <URL: http://www.ganesha.org/misc/dolphin.html>.*

SPOTZ: Animal Facts. [online].Phoenix Zoo, 2000–2002 [retrieved on Dec. 20, 2002]. Retrieved from the Internet: <URL: http://www.phoenixzoo.org/zoo/animals/facts/index.asp>.*

SPOTZ: Aardwolf. [online].Phoenix Zoo, 2000–2002 [retrieved on Dec. 20, 2002]. Retrieved from the Internet: <URL: http://www.phoenixzoo.org/zoo/animals/facts/aardwolf.asp>.*

Clark, Cynthia, "A Kaleidoscope of New Products", Feb. 22, 1999, Weekly, 246,8,25(1).*

Stacklin, Jeff, "Site kids go bananas for", Nov. 15, 1999, Crain's Cleveland Business, 30.*

(List continued on next page.)

Primary Examiner—S. Thomas Hughes
Assistant Examiner—Chanda L. Harris
(74) Attorney, Agent, or Firm—Gordon & Rees LLP

(57) ABSTRACT

A method and articles are described which provide a child with an interactive mixture of information content, activities, games, physical objects such as toys, and interconnection and communication with other like minded children and supportive adults, all of which are directed to instilling in the child an appreciation for wildlife and interest in the conservation of wildlife. A unique feature of the present invention is that it causes the child to focus on a specific wild animal, one which is symbolically "adopted" by the child and which the child comes to know on a very personal basis. This invention therefore allows the development of a bond between the wild animal and child as the child learns about and follows the day-to-day activities, life and well-being of the animal, which in turn leads to the child's development of knowledge and appreciation of wildlife generally.

9 Claims, 1 Drawing Sheet

U.S. PATENT DOCUMENTS

| | | | |
|---|---|---|---|
| 5,995,976 A | | 11/1999 | Walker et al. |
| 6,018,713 A | * | 1/2000 | Coli et al. ................... 705/2 X |
| 6,160,986 A | * | 12/2000 | Gabai et al. ............ 434/308 X |
| 2001/0049692 A1 | * | 12/2001 | Callaghan et al. ...... 707/104 X |
| 2001/0051875 A1 | * | 12/2001 | Miller et al. ................ 705/1 X |
| 2002/0012443 A1 | * | 1/2002 | Rhoads et al. .............. 382/100 |

FOREIGN PATENT DOCUMENTS

| | | |
|---|---|---|
| WO | WO 99/23591 | 5/1999 |
| WO | WO 99/26203 | 5/1999 |
| WO | WO 00/26804 | 5/2000 |
| WO | WO 01/29732 A2 | 4/2001 |

OTHER PUBLICATIONS

"Plush Toy Line Includes Online Fun for Added Educational and Play Value", Nov. 9, 1999, PR NEWSWIRE.*

"Toys that beep, buzz, and wiggle and giggle are a go", Dec. 1, 1999, Patriot Ledger Quincy, MA, Run of Paper ED, P 08g.*

The Wild Republic News [online]. K & M International, 2000 [retrieved on Apr. 3, 2003]. Retrieved from the Internet:<URL: http://www.wildrepublic.com/pages/news.html>.*

Marketing and Promotional Campaign [online]. National Wildlife Federation, 1996–2003 [retrieved on Apr. 3, 2003]. Retrieved from the Internet:<URL: http://www.nwf.org/productions/wolfcampaign.html>.*

Wildlife on easy Street: Affiliate Shops [online]. Wildlife on Easy Street, 2000 [retrieved on Apr. 3, 2002]. Retrieved from the Internet:<URL: http://www.wildlifeeasyst.com/affiliate_shops.htm>.*

Planet Rascals [online]. Copyright 2000 [retrieved on Nov. 14, 2003]. Retrieved from the Internet:<URL: http://www.planetrascals.com/>.*

* cited by examiner

METHOD AND ARTICLES FOR PROVIDING EDUCATION AND SUPPORT RELATED TO WILDLIFE AND WILDLIFE CONSERVATION

BACKGROUND OF THE INVENTION

1. Field of the Invention

The invention herein relates to the wildlife conservation and methods for education and promotion related to such conservation. More particularly it relates to methods for involvement of individuals, especially children, in appreciation of wildlife generally and conservation of wildlife using specific animals as surrogates for the larger population of general wildlife.

2. Description of the Prior Art

The plight of wildlife in many areas of the world is well-known. While not all species are endangered or threatened, virtually all have had their habitats limited by competing activities of humans, such as agriculture, domestic animal production and urbanization. This has created a real problem of maintaining sufficient habitat to avoid disruption of their normal living patterns and becoming dependent on the human environment. For many species the situation is critical, and there is a real question of their survival. While the loss of habitat and the threat of either local or global extinction of wildlife have been widely described and documented, a major problem for conservationists who are interested in preserving animals in the wild is to gain the attention of the members of the public generally and attract both financial and moral support. Many adults pay little heed to the needs and survival of wild animals and consequently do not transmit any concern for wildlife to their children.

Children, however, are known to be curious and to show great interest in animals when they are exposed to wildlife, whether by visits to the zoo or through viewing programs or films about wildlife on television, at school or at the theater. Unfortunately, there is often little support for this curiosity and interest in a child's home. Therefore to insure future support in adulthood by the current youngsters, what is needed is a medium and method which can reach children notwithstanding the relative indifference of their parents and which can allow children to explore the real world of animals and make an active contribution to the survival and well-being of the animals, while also developing a lifelong knowledge of animal life and behavior and interest in wildlife conservation.

Children of course are attracted by things that they find to be fun, such as games, toys and well-presented educational activities. Many successful educational programs are designed to provide a child with a series of enjoyable activities through which the child absorbs the educational information which is provided. When children learn in this manner, the information imparted commonly is retained and understood for a significantly longer time than information which is presented to them in what they considered to be a dull or boring manner. Further, children have been found to be well able to absorb and understand information about significant environmental issues when the information is presented in the context of enjoyable activities. It is also wellknown that the interests that children develop a young age often result in continued interest as they grow into their adult years.

It would therefore be advantageous if there were multimedia and interactive means for presenting information about wildlife conservation to youngsters in a manner that they would find enjoyable and which would allow them to relate to the welfare of animals at an interest level appropriate to the age of the child, such that it would be likely that the interest would be maintained and grow throughout the child's life.

SUMMARY OF THE INVENTION

The present invention provides a child with an interactive mixture of information content, activities, games, physical objects such as toys, and interconnection and communication with other like-minded children and supportive adults, all of which are directed to instilling in the child an appreciation for wildlife and interest in the conservation of wildlife. A unique feature of the present invention is that it causes the child to focus on a specific wild animal, one which is symbolically "adopted" by the child and which the child comes to know on a very personal basis. This invention therefore allows the development of a bond between the wild animal and child as the child learns about and follows the day-to-day activities, life and well-being of the animal.

For most children, particularly younger children, it is difficult to understand the nature of a large number of objects in a group. They usually cannot relate very well to the concept of an entire species of animals or even to the concept of animals at the level of a living group such as a herd, troop or pack. On the other hand, children are very good at forming attachment and understanding with a single animal, as is well exemplified by the bond rapidly formed between a child and a family pet. It is the function of the present invention to allow a child to form a similar, although more vicarious, bond with a specific wild animal. The invention herein provides the child with information and activities which allow that type of bond to form, in the same manner that a child engages in activities and obtains information about the life of the family pet.

The present invention provides an interactive electronic method, supplemented by physical objects such as games and toys, through which the child is introduced to, learns about and forms an attachment with the specific animal. In the present method an accessible wild animal, usually an animal which is resident in an animal preserve or which has been taken in by an animal welfare organization because of illness or injury, is selected and identified. The animal is assigned a familiar name, in the same manner that a family names the family pet. Often the animal chosen is from a threatened or endangered species, so that the child develops an understanding not just of wildlife in general but rather of a specific animal in a group whose very existence may be threatened. (For the purposes of this invention, definitional differences between "endangered," "threatened" and similar terms are not important. The term "endangered" will be used generally to broadly refer to wildlife which are considered to be "at risk.")

Once the animal has been selected and identified, the operator of this invention collects information about the animal and organizes it into a package that will appeal to children. Photographs and films are taken of the animal as it goes through its daily routine, information is gathered and tabulated regarding details about the animal such as its physical condition, age, size and similar characteristics, as well as information about its needs, such as the type of food it eats, the type of habitat it requires and type of interaction it has with other animals, such as predators or prey. From this information various interactive activities are developed, such as games that the child can play to learn about the animal or to have some experience as to what it would be like to live as the animal does, as well as other activities which allow the child to develop an understanding of the animal, its species, its life, and the hazards that it faces.

Such information is then made available through the process of this invention with electronic media such as CDs, DVDs, videotapes or cassettes, as well as by establishment of a Web site on the Internet. The information on the physical media such as the CDs will generally be fixed in time, presenting the animal at a particular time. It is, however, possible with recent developments that such media can be updated electronically, or of course updated media can be issued to supersede the earlier media. On the other hand, the Web site preferably will be interactive and can be updated on a frequent basis, even on a daily basis, so that when the child accesses the Web site, he or she will see the animal in essentially a current state. Indeed, if the Web site incorporates a live-action camera, the child can observe the animal in real time.

Also as part of the present invention, the operator provides a variety of wildlife-related toys and games which can be purchased by or for the child. Chief among these is a line of stuffed plush toys, respective ones of which are designed to resemble particular ones of the selected animals. The child can therefore not only learn about his or her "adopted" animal from CDs or the Web site, but can also have a toy version of that specific animal. This is particularly attractive to younger children, who commonly attribute "real" personalities to their teddy bears and other animal toys.

As part of present invention, the operator selects and identifies the animals, collects and assembles all of the animal-related information and creates the information media and the Web site, and develops and markets the toys, CDs, DVDs, and other products. The child (usually through an adult, such as parent or grandparent, acting on the child's behalf purchases the toys, CDs, DVDs and similar merchandise and pays for access to some or all of the areas of the Web site, such as access to portions of the Web site related to specific animals. The income received by the operator from the sale of the merchandise and access to any restricted areas of the Web site are divided to provide a first fund for operating the organization, producing and marketing the various media and products and maintaining the Web site, as well as a second fund for providing direct monetary assistance to entities such as the wildlife preserve or wildlife organization which cares for and houses in the specific animals. In addition, other portions of the fees may to go wildlife conservation in general, such as through payment to the specific wildlife preserve or organization which that organization passes on to other organization or a parent entity, or through payments to other wildlife conservation organizations which are not related to the specific animal. Thus the child's interest in the specific animal effectively extends to provide for overall wildlife conservation and preservation of wildlife environment.

Therefore, in a principal embodiment, the invention involves a method for promotion of and education regarding wildlife which comprises identifying an individual animal; compiling a database comprising a first body of information regarding the individual animal and a second body of information regarding animals other than the individual animal and incorporating the database in electronic media and on a global computer network system; providing an educational and play article having a configuration which is a recognizable effigy of the individual animal; providing for access to the database and opportunity to purchase the article and the electronic media by a person, the access to the database comprising symbolic adoption of the individual animal by the person, the symbolic adoption comprising registration of association with the animal of the person; requiring a first monetary payment by the person for access to at least a portion of the database and for purchase of the article and the electronic media; and apportioning a part of the first monetary payment to maintenance directly or indirectly of the individual animal and support of wildlife generally.

In another embodiment, the invention involves an educational and play article having a configuration which is a recognizable effigy of the animal selected and identified in the method described above.

In yet another embodiment, the invention involves an educational and play article comprising electronic media depicting the individual animal selected and identified in the method described above and including information regarding activities and environment of the animal.

Numerous other embodiments and objects will be evident from the description below.

DETAILED DESCRIPTION AND PREFERRED EMBODIMENTS

Figure 1:
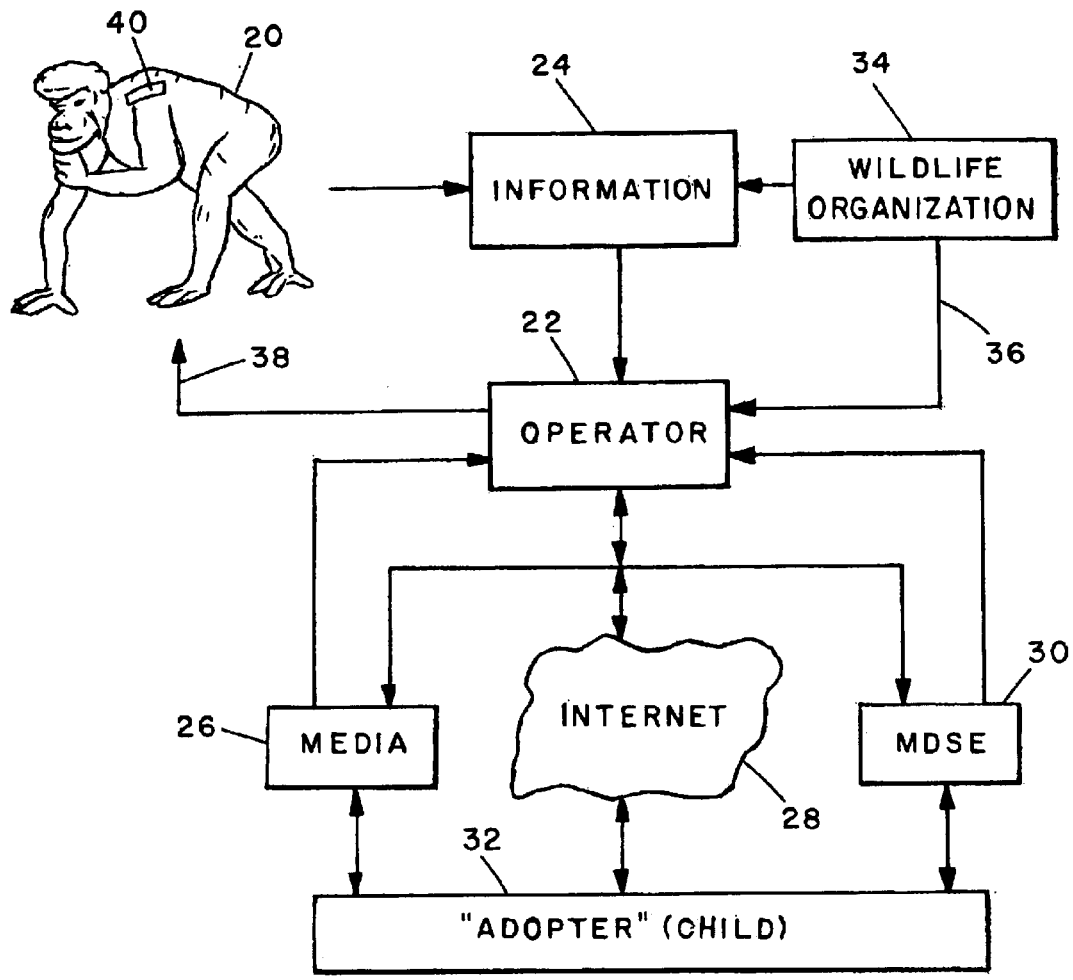
FIG. 1 is a graphical representation of the various components of the present invention and of their interrelation.

The method of the present invention is best understood by reference to FIG. 1 of the drawings. An animal 20 is first selected by the operator 22. While any animal which is attractive to children can be selected, whether or not endangered, In the embodiment exemplified here the animal 20 selected is a chimpanzee. Not only are chimpanzees very attractive to children, but the endangered status of chimpanzees in the wild is well-known, having been described in several popular books and on a number of widely watched television programs. While the animal 20 is exemplified here by a chimpanzee, many other animals are sufficiently attractive to most children to be used in the program of the method of this invention. Although there are no absolute limitations on the types of animals selected, it will generally be best to select animals which are easily recognized, especially by young children. Further, since the method depends on identification of specific animals, the particular animals selected will normally not be in the wild when they are selected, although some or most of their species probably will be in the wild. The choice is not limited to land animals, since some types of birds (e.g., ostriches, penguins) and some types of sea animals (e.g., porpoises, seals) often stay or are kept at specific locations. Thus, for example, the animals selected could be lions, tigers, wild sheep, zebras, porpoises, monkeys or apes, otters, elephants, and so forth. In the particular example used here, the chimpanzee 20 selected to be identified for the process of present invention is a resident of a privately held wild animal preserve, having been taken there after being found injured in the wild.

Figure 3:
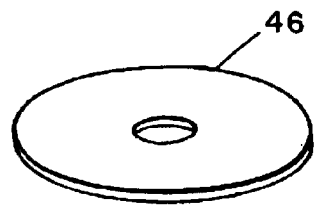
FIG. 3 is an oblique view of an electronic medium used in this invention, in this case illustrated as a CD or DVD.

Once a particular animal 20 is selected, information 24 about its habits and behavior are collected, its activities are captured on film and videotape and in electronic media and the sounds the animal makes are captured on audio tape and also in electronic media, and these are all compiled for presentation in CDs, DVDs, and similar media, as illustrated at 46 in FIG. 3, and also for display on the operator organization's Web site, as illustrated at 28 in FIG. 1. Also a large amount of information 24 regarding the life and activities of that animal species in the wild, its endangered status if applicable, the reasons for the endangerment, and other information which is of interest to children (and perhaps also to their parents) is collected and incorporated into the content of the media and for the Internet Web site. This content will of course be carefully edited and organized to provide high attraction to children. Such editing and organization will commonly include creation of attractive graphic representations for the information, editing and insertion of photographs, video clips, film clips, and animation sequences, all of which are intended to attract and hold children's attention. The information 24 presented is carefully checked to insure its accuracy and to present it in terms of that a child can understand. Content is preferably tailored to the age ranges of the particular groups of children to which specific CDs or portions of the Web site are focused. When a child begins participation in the program of the present invention, the age of the child is among the pieces of information collected as part of the initial registration process. Under the method of this invention there will preferably be a series of different CDs and similar media and different portions of the Web site, each of which is targeted toward children of different age groups. It will be evident that content directed toward early grade school children will be different from that targeted to later grade school children or junior high school children. Information 24 describing worldwide wildlife conservation generally will also be organized and presented in several different manners, formats, etc., each appropriate to a particular age group of children.

The range of the program of the present invention includes, as noted above, CDs and similar media 26, at least one Internet Web site 28 and also a merchandise component 30. The merchandise component will include facilities for manufacture and sale of toys, games, books and various other playthings and educational items that are related to animals generally and endangered species in particular.

Figure 2:
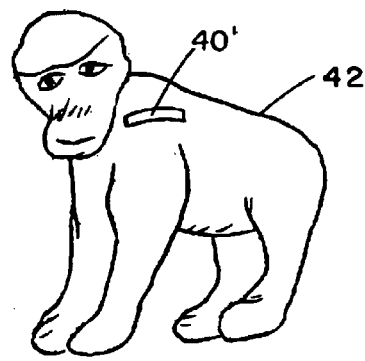
FIG. 2 is a perspective view of a plush toy representing the animal illustrated in FIG. 1.

A key item of merchandise 30 in the present program is a line of stuffed cloth animal toys 42, as illustrated in FIG. 2, each of which represents one of the selected animals, such as a plush toy representing the selected chimpanzee 20. In order to closely represent the selected animal as an individual which is familiar to the child, the plush toy 42 representing the animal will be, so far as practical, manufactured to look like the particular animal. Thus, for instance, if the animal has a prominent and uncommon marking or other feature such as 40, the marking will be incorporated into the appearance of the plush toy, as at 40'. As an example, the tongue of a lion selected as a representative animal usually protruded from its mouth, which was not a common behavior of lions but was prominent with that particular animal. In the plush toy representation, a small piece of fabric was used to simulate the protruding tongue of that particular lion, being a feature of the individual animal that would be immediately recognized by the children subscribing to the program. The use of such techniques enhances the attraction of the method of this invention, for children become very attached to toys which represent animals that they recognize as individuals. It will of course be recognized that manufacturing constraints and the nature of the typical plush materials will mean that the representation of the particular animal is still fairly general. Thus personalization of the plush toy to the particular animal will usually constitute including the appearance of one or a few distinctive features of that particular animal, such as the aforementioned marking 40', and many of the details of the animal's actual appearance will necessarily be generalized or omitted, such as having "feet" rounded as at 44 rather than including separate "toes."

As part of the education and personalization aspects of the present invention, each child 32 is designated as an "adopter" of a particular animal, and receives, in addition to various information and education items such as described above, a set of "adoption papers" identifying the "adopted" animal by name and indicating the child's individual association with the animal. Of course there will be many children 32 who are "adopters" of the same animal, but each will feel a particular relationship to the animal, in the same manner that an individual child feels an affectionate relationship to his or her own copy of a mass-market doll, notwithstanding that many other children also own copies of the same doll and have the same feelings toward their copies.

As part of this adoption process a significant portion of the income received by the organization are directed by the subscription organization 22 to be used for the care, housing, and feeding of the specific selected animals 20, as indicated at 38. This reinforces each child's feelings of affiliation with "his" or "her" animal, since the child is aware to a some degree (depending on the child's age) that a portion of the money paid by or on behalf of him or her is going to care for that specific animal. The child thus develops a degree of responsibility for maintaining the animal, in a manner analogous to a child's responsibility for taking care of a family pet. In practice this funding is normally directed by the operator 22 to the particular wildlife refuge or other caretaker organization which possesses the animal 20, and the operator 22 relies upon the special expertise of the caretaker organization to allocate those funds in an appropriate manner with respect to the particular animal 20. It will be recognized that to a large extent such funds may be allocated for the caretaker organization's animal environment enhancement and maintenance generally, which will include benefit to the specific animal 20.

As described above and indicated at 36, the operator 22 works in conjunction with one or more general wildlife organizations 34, which may be wildlife conservation organizations, zoos, national parks or game reserves, environmental groups working for habitat preservation, and the like. This interaction will include funding for the wildlife organization 34 from the operator 22 which can be expected to be reciprocated by the wildlife organization 34 by providing the operator 22 with information and materials related to wildlife generally, including endangered species, all of which information can be incorporated by the operator into enhancements to the program, its merchandise and information resources for the children 32. The method of this invention thus not only enhances children's education, knowledge and interest regarding wildlife and wildlife preservation but also can result in the creation and growth of a significant database of information about wildlife and wildlife preservation.

The creation of the CDs and other media indicated at 26 and creation and operation of the Web site indicated at 28 are done in a conventional manner, the details of which do not need to be describe here. It will be advantageous for the Web site to be divided into several different pages or groups of pages, some of which can be focused for individual age groups of the children 32, as described above. Other portions of the Web site can be designed to be attractive and interesting to all age groups of children as well as to their parents. The latter portions of the Web site may, for instance, be directed to announcements of various family-related wildlife events at places such as zoos or national parks, which a family could then visit as part of a family vacation. As another example, those family portions of the Web site could include announcements and details of significant wildlife conservation news items, especially those which involve endangered species, such as the recent successful breeding and release program for the endangered California condor.

As part of the division of the Web site into different portions, it is contemplated that some of the portions will be available for viewing on the Internet without charge, and others will require one-time or periodic fees for initial and/or continued access. For instance, there may be free general interest portions which are designed to attract the initial interest of a child and his or her parents or grandparents, explain the program to them, and encourage them to want the child to participate in the program. Such portions might include identification of the various individual animals 20 available for "adoption." However, for the actual in-depth involvement and "adoption" of a specific animal 20, the child 32 (or those acting on his or her behalf would have to pay an access fee for the portion of the Web site devoted to that particular animal 20, in the same manner that many information-content Web sites current charge access fees for access to or downloading of information from some parts or all of such Web sites.

It will be recognized that the method of this invention thus is a significant educational tool for teaching children about the environment and wildlife conservation. It has long been recognized that children learn best and retain longer what they learn if the learning activity is fun to them. The integrated aspects of the present method thus attract the interest of children and provide them with enjoyable activities in which they learn as they play. The method of the present invention thus represents a unique combination of learning and conservation which is mutually beneficial to both children and wildlife.

It will be evident that there are numerous embodiments of the present invention which are not expressly described above, but which are clearly within the scope and spirit of the invention. The above description is therefore to be considered exemplary only, and the actual scope of the invention is to be defined solely by the appended claims.

I claim:

1. A method for promotion of and education regarding wildlife which comprises:

identifying an individual animal;

compiling a database comprising a first body of information regarding said individual animal and a second body of information regarding animals other than said individual animal and incorporating said database into a form selected from a group consisting of electronic media and on a global computer network system;

providing an educational and play article having a configuration which is a recognizable effigy of said individual animal wherein said play article is in the form of a stuffed fabric representation of said individual animal, said representation including indicia recognizably related to said individual animal;

providing access to said database and an opportunity to purchase said article and said electronic media by a person, said access to said database comprising symbolic adoption of said individual animal by said person, said symbolic adoption comprising registration of association with said animal of said person, requiring a first monetary payment by said person for access to at least a portion of said database and for purchase of said article and said electronic media, said database as incorporated on said global computer network system having two portions, and said first monetary payment being required for access to a first of said two portions but not for access to a second of said two portions; and apportioning a part of said first monetary payment to maintenance of said individual animal and support of wildlife generally.

2. A method as in claim 1 further comprising providing merchandise related to said individual animal other than said article and said electronic media and providing means through said global computer network system for said person to purchase said merchandise for a second monetary payment, and apportioning a part of said second monetary payment to maintenance of said individual animal and support of wildlife generally.

3. A method as in claim 1 further comprising said access to said database comprising an interactive exchange between said person and said database through said electronic media or through a computer link to said global computer network system.

4. A method as in claim 1 wherein said second of two said portions of said database contains a limited portion of said first body of information about said individual animal and said first of said two portions of said database contains a more extensive portion of said first body of information about said individual animal.

5. A method as in claim 1 wherein said symbolic adoption further comprises issuance to said person of a unique identifier and using said identifier to gain said access to said first of said two portions of said database, said identifier also indicating said person's association with said individual animal.

6. A method as in claim 1 wherein said symbolic adoption further comprises intercommunication through said computer global network system for said person to communicate with another person who has also obtained a symbolic adoption of said individual animal.

7. A method as in claim 1 further comprising identification of a plurality of individual animals, each of which is of a different species.

8. A method as in claim 7 further comprising said person being a child.

9. A method as in claim 8 further comprising identifying of said child, wherein said child is of any age.

* * * * *